(12) United States Patent
Matis

(10) Patent No.: US 7,940,838 B1
(45) Date of Patent: May 10, 2011

(54) DISTORTION CHARACTERIZATION SYSTEM

(75) Inventor: Kurt R. Matis, Troy, NY (US)

(73) Assignee: Applied Wave Research, Inc., El Segundo, CA (US)

( * ) Notice: Subject to any disclaimer, the term of this patent is extended or adjusted under 35 U.S.C. 154(b) by 0 days.

(21) Appl. No.: 12/460,566

(22) Filed: Jul. 20, 2009

Related U.S. Application Data

(63) Continuation of application No. 10/109,753, filed on Mar. 29, 2002, now Pat. No. 7,577,192.

(51) Int. Cl.
*H04B 3/46* (2006.01)

(52) U.S. Cl. ..... 375/227; 375/229; 375/348; 455/67.11; 455/115.2; 455/226.2; 324/613; 324/620; 324/76.11

(58) Field of Classification Search .................. 375/224, 375/227, 229–233, 285, 346, 348; 455/67.11, 455/67.13–67.15, 115.1, 115.2, 226.1–226.3; 324/755, 759, 763, 612, 613, 620, 637, 638, 324/76.11, 76.13, 76.19
See application file for complete search history.

(56) References Cited

U.S. PATENT DOCUMENTS

| | | | | |
|---|---|---|---|---|
| 6,731,914 B2 * | 5/2004 | Creigh et al. | ............... | 455/115.1 |
| 6,954,495 B2 * | 10/2005 | Piirainen | ...................... | 375/233 |
| 7,634,032 B2 * | 12/2009 | Chu et al. | ...................... | 375/346 |

* cited by examiner

*Primary Examiner* — Dac V Ha

(57) ABSTRACT

This invention provides a system for evaluating the performance of electronic components and systems by minimizing or eliminating intersymbol interference (ISI). The apparatus includes a transmitter, a device under test, a receiver, and at least one electrical connection between the transmitter and receiver that bypasses the device under test. The electrical connection between the transmitter and receiver transmits information characterizing the intersymbol interference of the transmitted signal to the receiver. The receiver includes an equalizer that uses the information characterizing the intersymbol interference of the transmitted signal to minimize or eliminate intersymbol interference in the received signal where the distortion introduced by the device under test can be isolated and characterized. The methods and devices can be used to evaluate the performance of data transmission systems and components, for example, software models of high-speed data transmission systems, and, among other things, reduces the need for fabricating prototype hardware for testing.

15 Claims, 14 Drawing Sheets

DISTORTION CHARACTERIZATION SYSTEM

CLAIM OF PRIORITY AND CROSS-REFERENCE TO RELATED APPLICATIONS

This application claims the benefit of U.S. patent application Ser. No. 10/109,753 filed on Mar. 29, 2009, titled "Method and Apparatus for Characterizing the Distortion Produced by Electronic Equipment" and U.S. Provisional Application No. 60/279,640 titled "Equalization for Intersymbol Interference" filed Mar. 29, 2001, both of which are incorporated by reference in their entirety.

BACKGROUND OF THE INVENTION

1. Technical Field

This invention relates generally to apparatus and methods used for transmitting electrical signals in communication systems. Specifically, the invention provides improved methods and apparatus for evaluating the signal distortion produced by electronic components in communication systems.

2. Related Art

A majority of people in our society are now aware of digital technology. The use of the word "digital" refers to the representation of information by discrete numbers, or digits. Digital representation of information offers several advantages over analog representation. It is desirable in the art of data communication to represent and communicate information with arbitrary accuracy. The storage and retrieval of information in digital format has allowed much-improved flexibility and fidelity. Digital music and video storage are applications that are familiar to many.

The most popular method of representing digital information is in the form of Binary digits ("BITs"). In this representation, information is represented as one of two possible states, either a zero or a one. This is the simplest form of representation, corresponding to a switch being in the on or off position. This is the form of representation employed in computers, where electrical switches are set to either the on or off position to represent bits. In the discussion that follows, data is transmitted, for example, by digital equipment in the form of bits.

There is often a need in the art to transmit bits from their source to a remote destination. It is desirable to communicate bits reliably so that the underlying information the bits represent will be received correctly and accurately. In many cases, the destination is a great distance from the source and the bits may be transmitted through a wireless Radio Frequency ("RF") link.

The communication channel can be viewed as the medium which enables communication to take place. In the case of an RF transmission, the channel would represent the signal path(s) between transmit and receive locations. A channel in a data communication system is typically a source of degradation to the communication process, for example, a source of noise. The degradation that typically occurs in a channel can be degradation due to atmospheric noise, interference from other signals or many other sources. In addition to transmitting data across a channel which is remote in space, data transmission may also comprise, for example, the data storage scenario, where the destination is remote in time. Thus, conventional data transmission systems may be associated with multimedia storage where the channel may represent the sources of error and distortion in the storage medium such as with the operation of a Compact Disc ("CD") or a Digital Versatile or Video Disk ("DVD").

Typically, the channel of a data transmission system communicates with a receiver. The receiver is a device that examines the incoming analog signal and makes its best estimate of the bit that was transmitted during each corresponding time period. Modern receivers often make use of information concerning the type and state of the channel as well as the details of the transmitted signal format to make correct decisions about the transmitted bits.

One of the operations typically performed by the receiver, in order to correctly estimate the transmitted bits, is to compare a copy of the known pulse shape to each received pulse containing noise as it is received at the receiver's input during the corresponding bit interval. This precise mathematical operation is known in the art as correlation. In the correlation process, the receiver juxtaposes the known transmitted pulse shape with a noisy received pulse, multiplies them together, and integrates the result over the bit period.

In some cases, the bandwidth allocation over which a given user is allowed to transmit a signal is limited, for example, to a very narrow bandwidth. Typically, in order to decrease a digital signal's bandwidth, a very slowly changing pulse shape may often be used. In order to transmit the desired signal over the narrow bandwidth, the signal pulses are transmitted superimposed on or overlapping one another. However, when the shape of the pulse changes slowly, it may take longer than one bit period to start up, then turn off the pulse. Unfortunately, when these pulses are superimposed, it becomes difficult to recognize the individual pulses corresponding to individual bits of data. This situation is referred to in the art as intersymbol interference ("ISI"). Although the bandwidth of a signal utilizing a more slowly changing pulse is narrower, the extended pulse skirts cause intersymbol interference, resulting in an increased number of bits identified as errors.

In some prior art transmission systems, receivers may include sophisticated algorithms for addressing inaccuracies due to ISI. Instead of looking at individual received pulses, these algorithms typically examine each given pulse as well as certain of its neighbors. These algorithms are typically called equalizers in the art and they can effectively subtract off or remove the interference caused to a symbol by its neighbors. These algorithms are typically implemented in Digital Signal Processing ("DSP") software as algorithms which operate on the sampled receiver outputs. In essence an equalizer must examine groups of received pulses simultaneously considering all possible combinations of zeros or ones in each position. Quite often the number of neighboring pulses that affect a given pulse is small. For example, in some prior art equalizers, only the immediate predecessor and immediate successor of a given pulse overlap and thus affect the given pulse. In this case, the so-called ISI span of the pulse is three bits. The ISI span typically comprises the current symbol and the other symbols affecting it.

One simple type of equalizer used in the prior art is referred to as a transversal equalizer. A transversal equalizer is a relatively simple device in which received neighboring pulse correlation values are weighted and subtracted from the corresponding current bit pulse the receiver is attempting to process or decide upon. The weighting coefficients designated $c_i$ are typically constant numbers. In this way the ISI from neighboring bits can be partially removed. The word "partially" is important here since the receiver having a transversal equalizer does not know the exact value of the neighboring bits and thus must estimate their weighting coefficients. Therefore, the accuracy of such equalizers is limited by the algorithm used to guess the value of the weighting coefficients knowing that at least some error is inherent in such equalizers.

Much research activity in the digital communications field focuses on new algorithms for equalization of slowly-changing pulse shapes. Although there are many different types of architectures for equalizers, the errors inherent in the simple transversal equalizer are typical of the errors that are inherent in other similar equalizers. There is need in the communication arts to provide a system that minimizes or eliminates the errors inherent in prior art communications system equalizers.

SUMMARY

This invention overcomes limitations of prior art data transmission systems by providing devices and processes capable of manipulating signals to minimize or eliminate the contribution of intersymbol interference ("ISI") to the distortion introduced over a channel, such as channels having electronic components.

This invention provides systems that address many of the limitations of prior art methodologies. For example, aspects of the invention obviate the need for a manufacturer to design and build complex equalization algorithms and/or circuits in the early stages of a communication system design by allowing for the testing of software models of proposed designs. In addition, this invention provides improved accuracy of equalization by removing at least some ISI and in some aspects essentially all of the ISI, thus allowing the tests of electronic components and electronic systems to reveal only the effect of other degradations or distortions in devices undergoing testing.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis being placed instead upon illustrating the principles of the invention. In the figures, like reference numerals designate corresponding parts throughout the different views.

DETAILED DESCRIPTION

Figure 1:
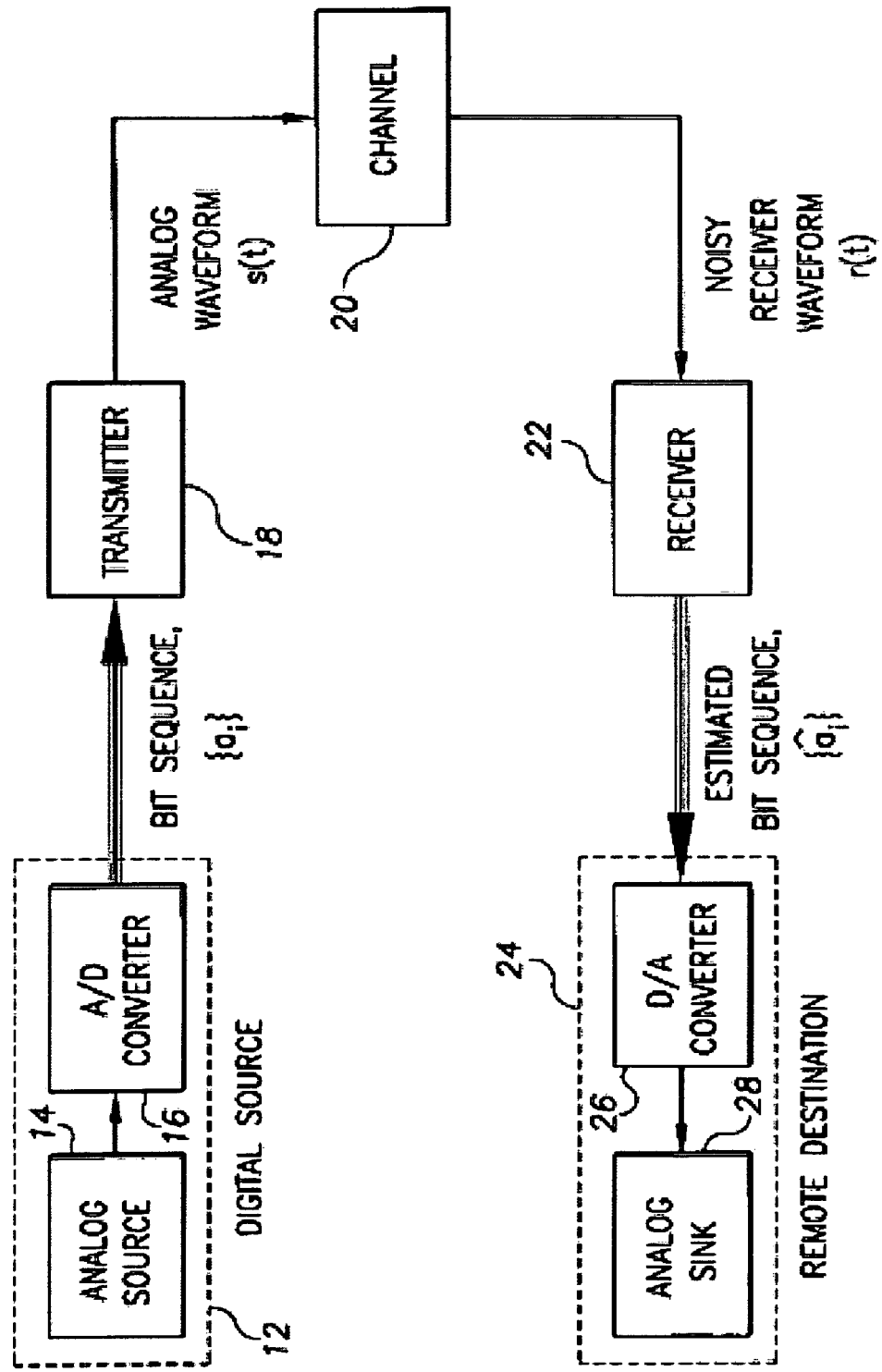
FIG. 1 is a block diagram of a digital communications system.

FIG. 1 illustrates a digital communication system 10 in block diagram format. In this diagram, the notation $\{a_i\}$ is used to represent a sequence of bits, or bit stream, to be transmitted to a remote destination. Communication system 10 typically includes an digital signal source 12, for example, a digital signal source having an analog source 14, for example, a voice signal or a video signal, and an analog-to-digital (A/D) converter 16 which produces the digital bit sequence $\{a_i\}$ from the analog signal provided by source 14. Bit stream $\{a_i\}$ may represent any form of analog information, such as a human voice, music, or data, among other forms, that has been converted to digital format. In computer-to-computer communications, the data information is already provided in bit form, the language of computers, and no A/D converter 16 is required. However, bit stream $\{a_i\}$ may be any form of information or data that is represented by a sequence of bits.

According to the prior art, bit sequence $\{a_i\}$ is transmitted by transmitter 18, typically in analog wave form, s(t), through or over a channel 20 to a remote receiver 22. Though the receiver 22 may be located a short distance from transmitter 18, in many cases, the destination for a signal transmitted by transmitter 18 is a great distance from the source, for example, hundreds of miles, and the bits may be transmitted through a wireless Radio Frequency ("RF") link. Typically, transmitter 18 is responsible for turning the bit sequence $\{a_i\}$ into an analog pulse-like signal s(t) that is to be emitted over a physical channel such as a wire. In the system engineering field, the term "signal" is used to refer to any time-varying quantity. In the case of an RF signal, the transmission process would also entail modulating the data onto a high-frequency RF carrier perhaps in the megahertz or even gigahertz range.

In many prior art communications systems such as system 10 the bandwidth over which the signal $\{a_i\}$ is allowed to be transmitted is narrow. As a result, transmitter 18 may transmit the signal $\{a_i\}$ as slowly changing overlapping pulses. These overlapping pulses comprise a type of signal distortion known in the art as intersymbol interference ("ISI"). Typically, in prior art communications systems, transmitter 18 transmits signal s(t) over channel 20 having at least some ISI.

Channel 20 may be any medium which enables communication to take place. In the case of an RF transmission, channel 20 can represent the signal path(s) between the location of transmitter 18 and the location, of receiver 22. Channel 20 may be a physical channel such as a wire or cable, but channel 20 may also be a wireless channel such as that used for RF transmissions, satellite communications, or cellular phones. Channel 20, regardless of its nature, typically introduces at least some form of distortion or noise where the signal r(t) received by receiver 22 contains at least some distortion that was not present in signal s(t) transmitted by transmitter 18. The distortion introduced by channel 20 is typically in addition to the ISI introduced by transmitter 18.

At the remote destination, receiver 22 has the job of examining the incoming analog signal r(t) and making its best estimate of the bit that was transmitted during each corresponding time period. This time period is sometimes called the bit period. The notation $\{\hat{a}_i\}$ is used in FIG. 1 to denote an estimate of the bit sequence produced by receiver 22 of bit sequence $\{a_i\}$ received by receiver 22. Typical prior art receivers often make use of information concerning the type and state of channel 20 as well as the details of the transmitted signal format to make correct decisions to produce $\{\hat{a}_i\}$ from the transmitted bits $\{a_i\}$.

The estimated bit sequence $\{\hat{a}_i\}$ is then forwarded to the remote sink 24 such as a computer or a cellular telephone. Remote sink 24 may typically include a digital or analog sink 28, and may include a digital-to-analog (D/A) converter 26 and an analog sink 28 such as a computer or a storage medium, as is typical in the art.

Figure 2:
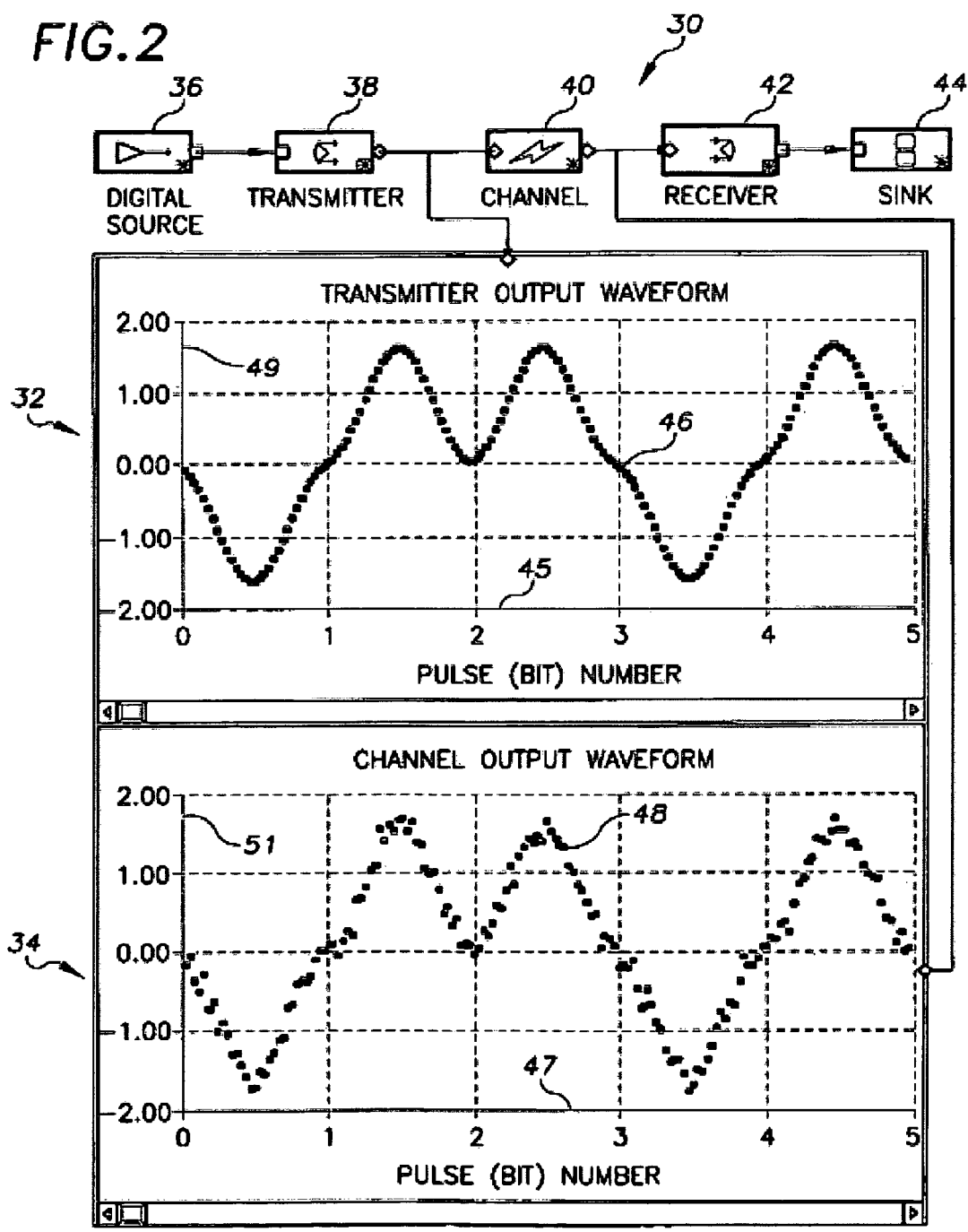
FIG. 2 is a block diagram with computer video display images illustrating two typical waveforms of a prior art data communication system.

FIG. 2 is a computer video display showing a schematic block diagram of a prior art data communication system 30, similar to system 10 shown in FIG. 1, and also showing two plots 32 and 34 of waveforms 46 and 48 associated with the data communication system 30. FIG. 2 was produced using the DSP software ACOLADE which is designed and marketed by Applied Wave Research, Inc. of El Segundo, Calif. ACOLADE software tool allows engineers and designers to create and test new communication system designs using a personal computer. The ACOLADE software was marketed under the name Visual System Simulator, is described in the brochure "Visual System Simulator 2002" (February 2002). As displayed using the software, system 30 includes a digital source 36, a transmitter 38, a representative channel 40, a receiver 42, and a remote sink 44. The output of transmitter 38 is displayed as output waveform 46 shown in plot 32. The signal received by receiver 42 is displayed as channel output waveform 48 in plot 34.

In the context of the communication systems 10 and 30, the term "signal" means the variation of transmitter 38 output voltage versus time. This type of signal is often called a ~waveform because of the peaks and valleys the signal seems to exhibit. In plots 32 and 34, time is shown in terms of bit durations on the x-axis 45 and 47 and voltage is shown on y-axis 49 and 51. For the example shown in FIG. 2, a segment equal to 5 bit durations is plotted. A bit duration could correspond to anything from a few microseconds to tens of nanoseconds in modern high-speed digital communication systems. Transmitter 38 transforms a stream of ones and zeros into a stream of pulse like waveform segments, each representing the corresponding bit during the bits allocated time interval. Note that the waveforms 46 and 48 consist of a series of dots. Digital computers deal with discrete sequences of numbers, so that it necessary to represent analog waveforms with series of closely spaced samples. DSP algorithms, such as those written in DSP software, are designed to operate on such number sequences. It can be shown that no information about the underlying analog waveform, for example, the analog waveform produced by analog source 14 in FIG. 1, is lost if the samples are sufficiently closely spaced. In the example shown in FIG. 2, 32 samples are used to represent the analog waveform during each bit period, though smaller or larger sample rates may be used. The relatively large number of samples used in the plots 32 and 34 is typically much more than adequate for correct representation of a signal such as signal s(t) in FIG. 1.

The particular shape of pulses 46 and 48 can be selected for various reasons. Conservation of channel bandwidth is usually of major concern. For this reason, the shape of a pulse, such as pulses 46 and 48, must be smooth with no sharp edges. Fast time variations in a transmitted signal cause the signal to have a wide frequency content. Access to RF channels is normally provided in terms of narrow frequency slots assigned to any particular user. The signal must not have a frequency content that exceeds the width of the allocated frequency band. Thus, the need for careful shaping of the transmitted pulses similar to the pulses shown in FIG. 2.

In the example shown in FIG. 2, channel 40 is designed in DSP software to add a small amount of noise to the signal 46 transmitted by transmitter 38. As a result, the signal 48 output by channel 40 is somewhat ragged in shape compared to signal 46. In the algorithm represented by channel 40, noise is generated with a pseudorandom number generator. In this case, the numbers have a Gaussian distribution, a distribution well-known in the communications field. Channel 40 may cause many more complex signal degradations, distortions, or noise, such as signal fading and multiple received paths. In the example system 30 shown in FIG. 2, only additive noise is introduced by channel 40. As can be gleaned from the channel output waveform 48, the noise introduced by channel 40 is not as great as to cause confusion about the transmitted bits, that is, the shape of the transmitted waveform 46 is still quite clear from the shape of waveform 48. If the noise introduced by channel 40 were sufficiently large, however, it might not be possible to correctly decide on the transmitted bits. Since the noise impacts the system's accuracy, bits can be declared in error with a certain Bit Error Rate ratio ("BER"). BER is an important and often used measure of performance in the communications field.

Figure 3:
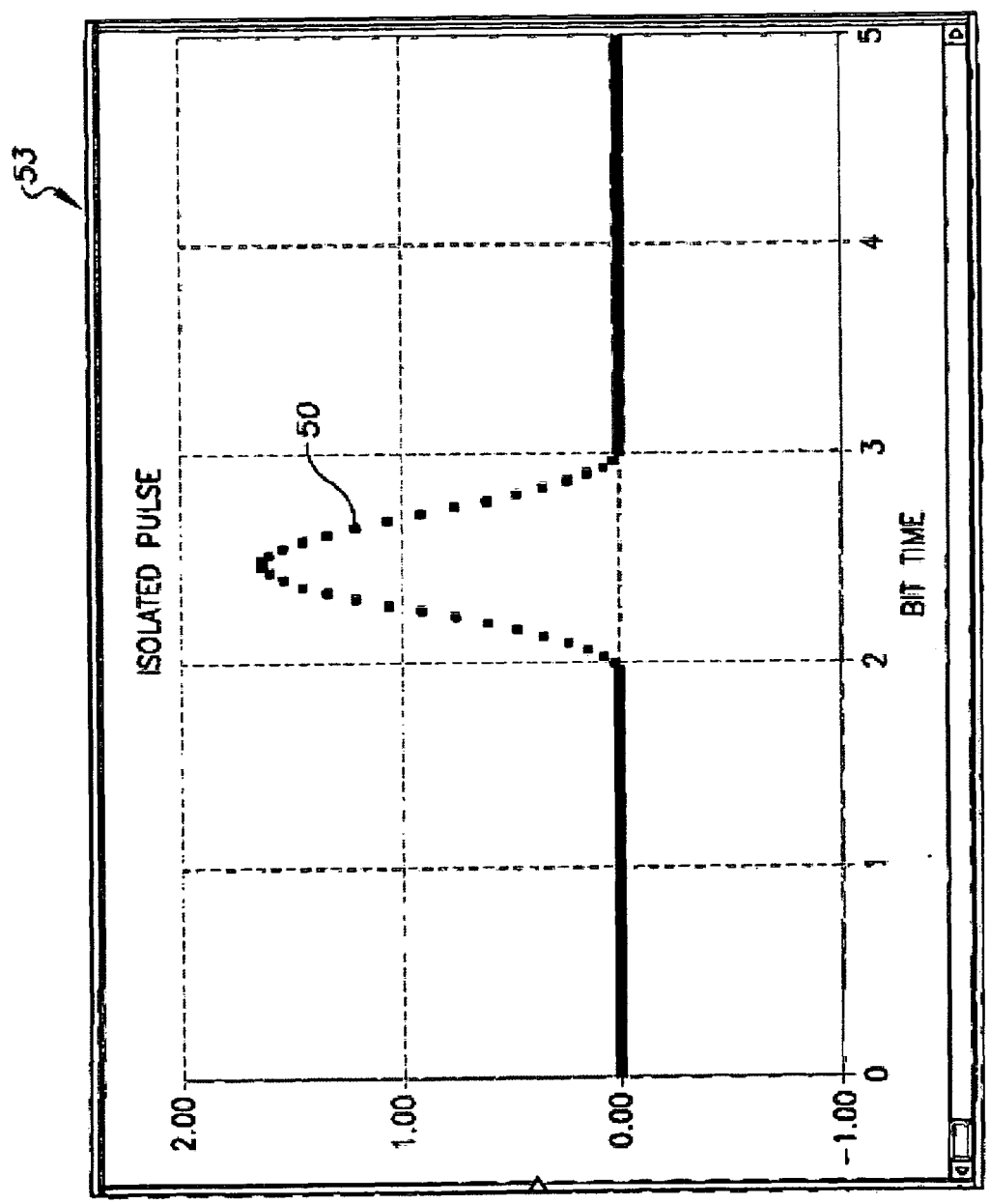
FIG. 3 is a computer video display image illustrating a typical reference wave pulse.

In order to perform its function of correctly estimating the transmitted bits, receiver 22 (or receiver 42 in FIG. 1) compares a copy of a known reference pulse shape to each noisy received pulse, r(t) in FIG. 1, observed at its input during the corresponding bit interval. The precise mathematical operation is known in the art as correlation. Typically, in correlation, receiver 22 juxtaposes the known transmitted pulse shape with a noisy received pulse shape 48, multiplies them together, and integrates the result over the bit period. For example, a representative reference pulse 50 is shown in FIG. 3. FIG. 3 is a computer video display showing a plot 53 of typical reference wave pulse 50 as created by DSP software. As shown in FIG. 3, correlation reference pulse 50 ramps up and then ramps down during a single bit interval. The software of receiver 22 and 42 can more accurately estimate the correct transmitted bit using a reference pulse, such as pulse 50, if the noise in received signal r(t) is not too large.

Figure 4:
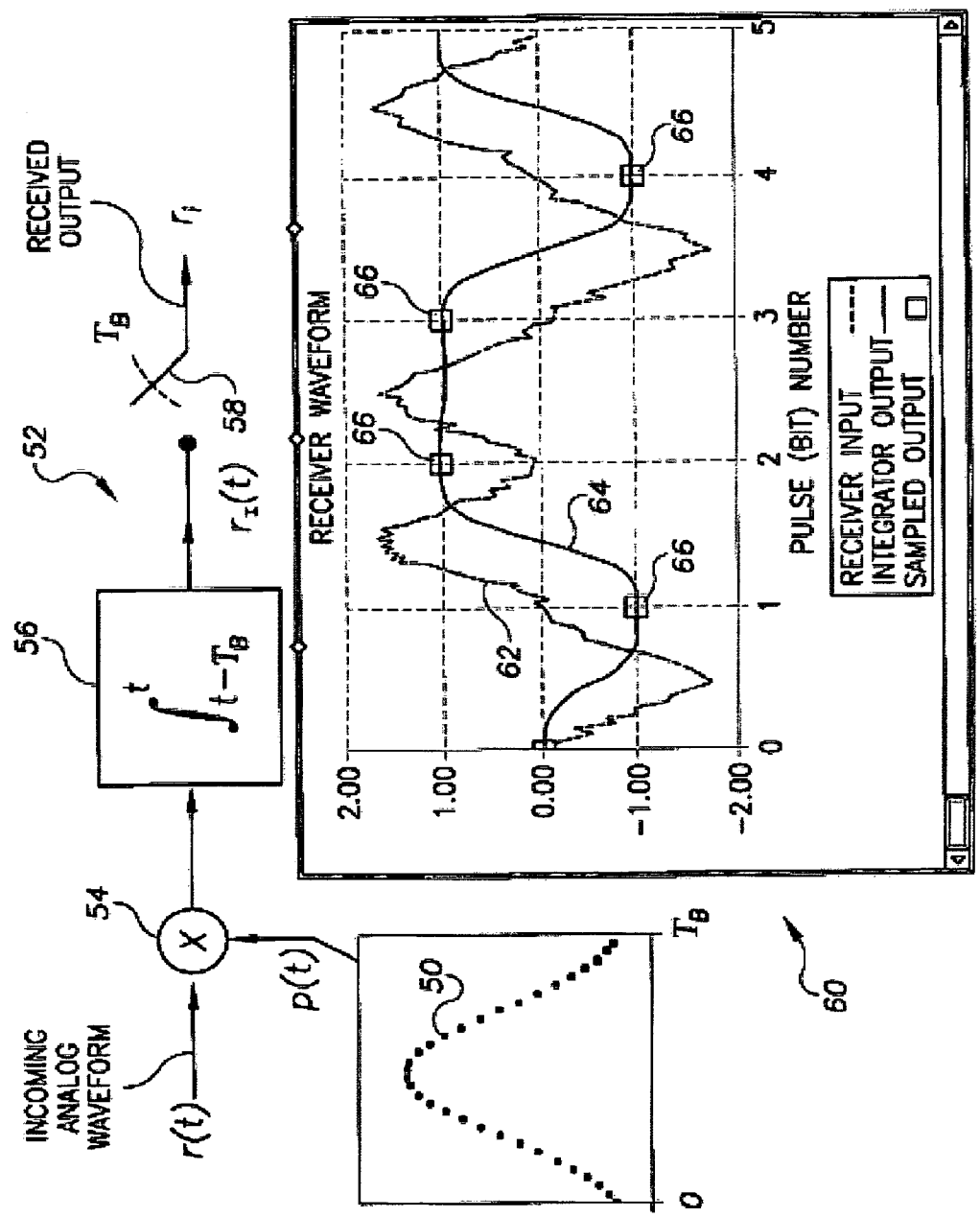
FIG. 4 is a block diagram of a prior art correlator/integrator and an associated computer video display of the waveforms associated with the correlator/integrator as created by the DSP software.

A typical schematic block diagram of a prior art correlator/integrator 52 and the representative waveforms associated with the correlator/integrator 52, such as a correlator/integrator located in receivers 22 and 42 are shown in FIG. 4. The schematic of the correlator/integrator 52 includes a multiplication block 54, an integration block 56, and a sampling switch 58. Reference pulse 50 as shown in FIG. 3 is also shown in FIG. 4. Receiver 22 and 42 (see FIGS. 1 and 2) estimates the transmitted signal $\{a_i\}$ by sliding the reference pulse 50 along the received waveform r(t) and integrating the product of the two over one bit period $T_B$. Multiplication block 54 receives a noisy pulse r(t) and multiples it by a reference pulse p(t). For example, reference pulse 50 shown in FIGS. 3 and 4 forwards the product to integration block 56.

Integration block 56 integrates the product of multiplication block 54, that is, r(t)×p(t), over the bit period $T_B$. The output of the integration block 56, that is $r_i(t)$ is then sampled by sampling switch 58 at every bit period $T_B$, for example, at the optimum time, to yield a receiver output signal $r_i$.

The waveforms associated with the correlator/integrator 52 are shown in plot 60 in FIG. 4. Plot 60 includes displays of three data sets. The dotted line waveform 62 of plot 60 represents the noisy input waveform r(t) received by the receiver 22 or 42. Waveform 62 is the same as waveform 48 shown in plot 34 of FIG. 2, that is, the noisy output of channel 40. Solid line waveform 64 in plot 60 represents the output of integrator 56, that is, $r_i(t)$ as the reference pulse 50 is slid along the input waveform r(t) a sample at a time. Integrating over the bit time, for example, by integrator 56 corresponds to each relative time shift. This is the definition of the correlation operation. Finally, the output of the integration is sampled at each time instant and the value of these samples is shown as open squares 66. Note that there is only slight deviation from the ideal values of (−1.0, +1.0) due to the noise introduced by channel 40. Accordingly, the receiver (22 or 42) would declare a zero has been transmitted if the sampled correlation value was measured to be below 0.0 and that a one has been transmitted if the sampled correlation value is above 0.0.

The optimum sampling time is often determined by a special type of diagram, called an eye diagram in the art. The goal of the use of an eye diagram is to determine the time at which the correlator/integrator outputs are at their highest value and are thus least likely to get confused with an output corresponding to a bit of the opposite polarity. In this case, a +1.0 would get confused with a −1.0, or vice-versa, corresponding to a mistake in the decision about whether a zero or a one was transmitted. The eye diagram is a graphical plot commonly used in the art that is constructed by overlaying many traces of the correlator/integrator output, $r_i$ on the same time axis and plotting them together. As time goes on, all possible bit patterns will appear on the eye diagram in the output waveform segment, filling in all possible paths or trajectories that the waveform can take. If, at the sampling time, none of these trajectories falls near the 0.0 decision threshold, the zero bits will not be confused with the one bits and vice-versa.

Figure 5:
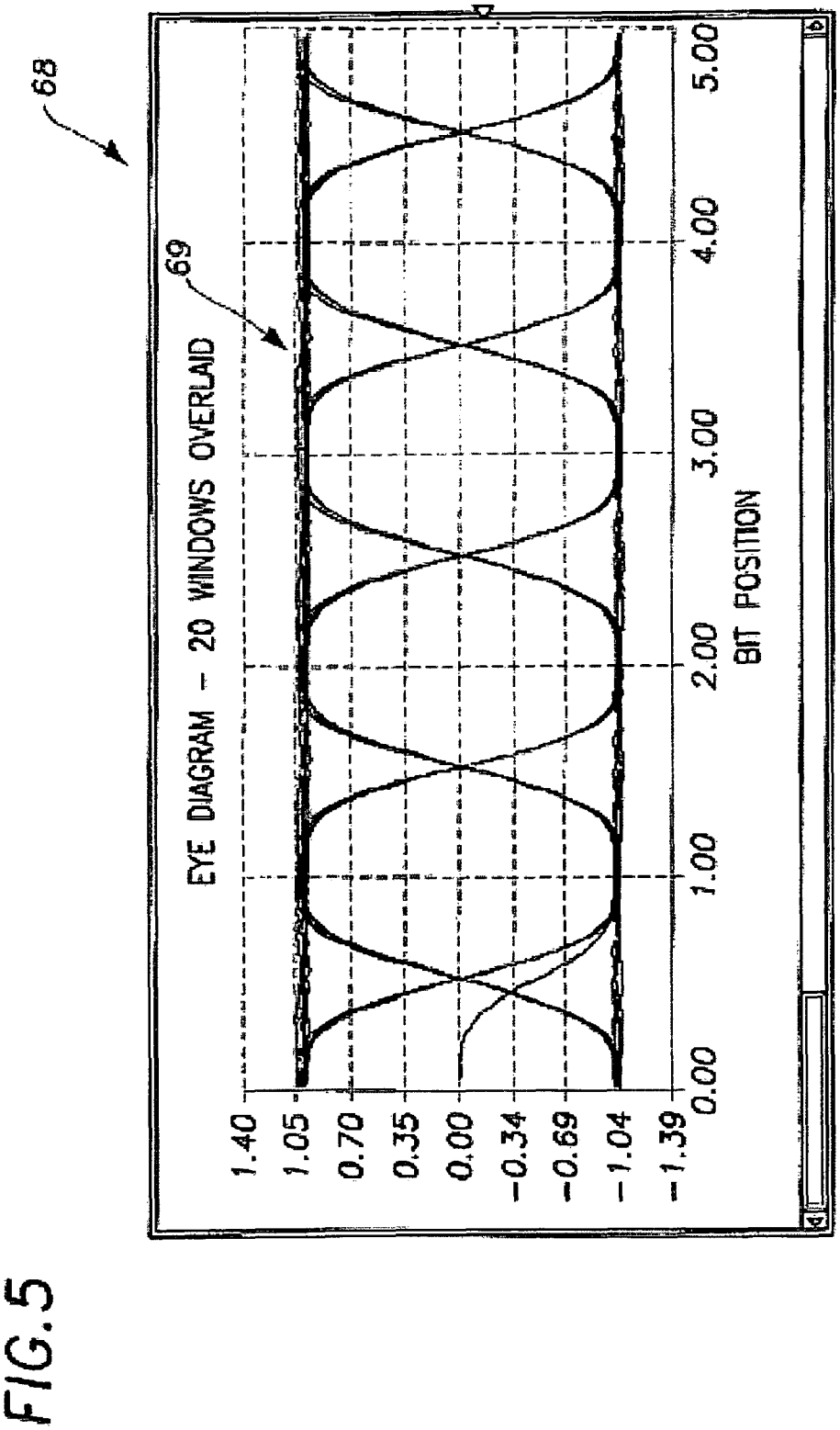
FIG. 5 is a computer video display of an eye diagram associated with the prior art integrator/correlator shown in FIG. 4.

A typical plot 68 of an eye diagram 69 for integrator 52 shown in FIG. 4 is shown in FIG. 5. FIG. 5 is a computer video display generated by DSP software. The eye diagram 69 has been generated over an interval corresponding to five bit times and thus five eyes are shown (four full eyes and two half eyes). Note that the eye is wide open at the chosen sampling times (that is, at 1.00, 2.00, etc.). In this particular example shown in FIG. 4, 20 waveform segments or time windows have been overlaid on top of one another to produce eye diagram 69. This means that the waveform from bit times 0.0 to 5.0 has been overlaid on the time waveform from bit times 5.0 to 10.0 and the waveform from bit times 10.0 to 15.0 and the waveform from bit times 15.0 to 20.0, etc., until bit time 100.0 is reached. The independent x-axis of eye diagram 69 represents the time offset within each of these overlaid segments. As can be seen from FIGS. 3 and 4, the ramification of choosing the sampling time properly is a clear separation between the zero and one output levels, in this case −1.0 and +1.0.

Figure 6:
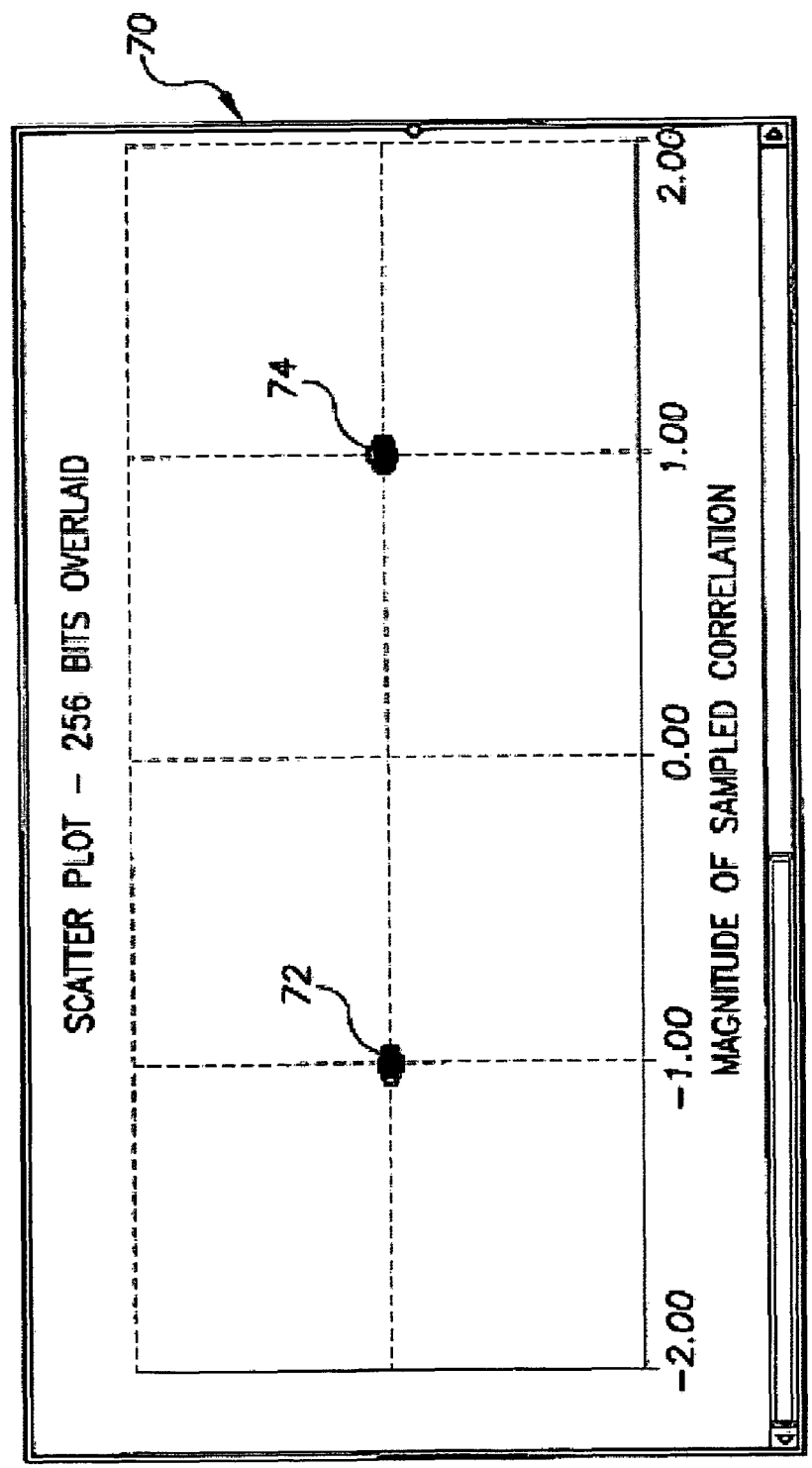
FIG. 6 is a computer video display of a scatter plot associated with the eye diagram of FIG. 5.

In addition to producing eye diagrams, such as eye diagram 69, it is also useful to examine the statistical scatter of the sampled value in eye diagram 69 by what is known in the art as a scatter plot. A scatter plot 70 of the data shown in FIG. 5 is shown in FIG. 6. FIG. 6 is a computer video display produced by the DSP software. Scatter plot 70 in FIG. 6 is a simultaneous display of the values shown in FIG. 5. Scatter plot 70 is created in a manner similar to eye diagram 69. In scatter plot 70, many sampled outputs appear simply overlaid on the same nominal points 72 and 74. In scatter plot 70, the deviation of the set of points from the nominal or ideal positions 72 and 74 appears as a dispersion or cloud about the nominal values 72 and 74. Scatter plot 70 in FIG. 6 represents the scatter of 256 sampled values. As expected, the overlaid values shown in the scatter plot of FIG. 6 are very close together, that is, the values fall almost exactly on their nominal (noiseless) values of −1.0 and +1.0 at 72 and 74. The little or no dispersion of the data points in plot 70 indicates that for this situation, the probability of declaring a transmitted bit erroneously would be very small.

Figure 7A:
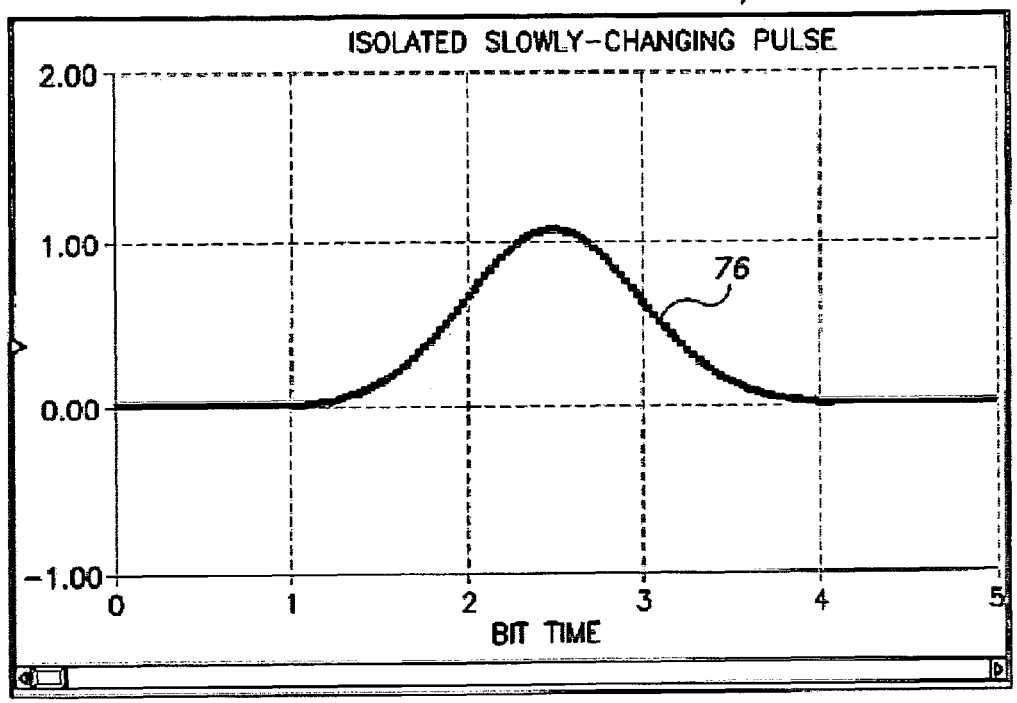
FIGS. 7A and 7B are computer video displays of an isolated slowly changing electrical pulse and an associated waveform produced by overlapping pulses as created by the DSP software.
Figure 7B:
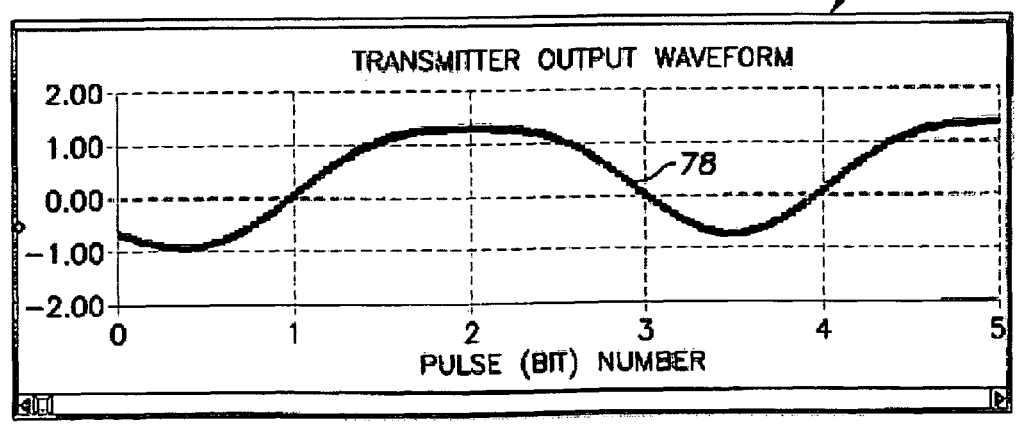

In some cases, the bandwidth allocation for a given user is very narrow. In order to decrease a digital signal's bandwidth, a very slowly changing pulse shape must often be used. Due to the limited bandwidth, slowly changing pulses representing individual bit sequences are overlapped when transmitted. FIG. 7A illustrates an example of a plot 75 of an isolated very slowly changing pulse 76. FIG. 7B shows a plot 77 of digital waveform 78 composed of four overlapping waveforms 76. FIGS. 7A and 7B are computer video displays produced by the DSP software. The waveforms 76 and 78 shown in FIGS. 7A and 7B are similar to the waveforms 46 and 48 shown in FIG. 2. As can be seen from FIG. 7A, waveform 76 is changing so slowly that is takes longer than one bit period to start up, then turn off. Unfortunately, when more than one waveform 76 is superimposed, as shown by waveform 78, it is difficult to recognize the individual waveforms 76, or pulses, that corresponding to individual bits. This is because the individual waveforms 76 overlap one another in producing waveform 78. Again, this is referred to in the art as ISI.

Figure 8A:
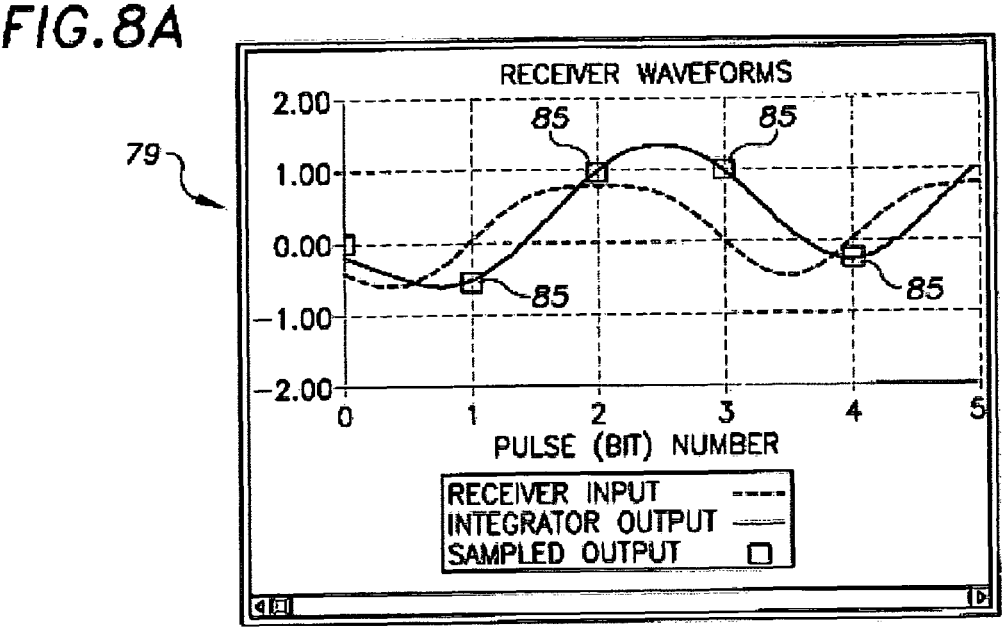
FIGS. 8A, 8B, and 8C are computer video displays of the transmitted waveforms, eye diagram, and scatter plot, respectively, for the transmitted waveform shown in FIG. 7B as created by the DSP software.
Figure 8B:
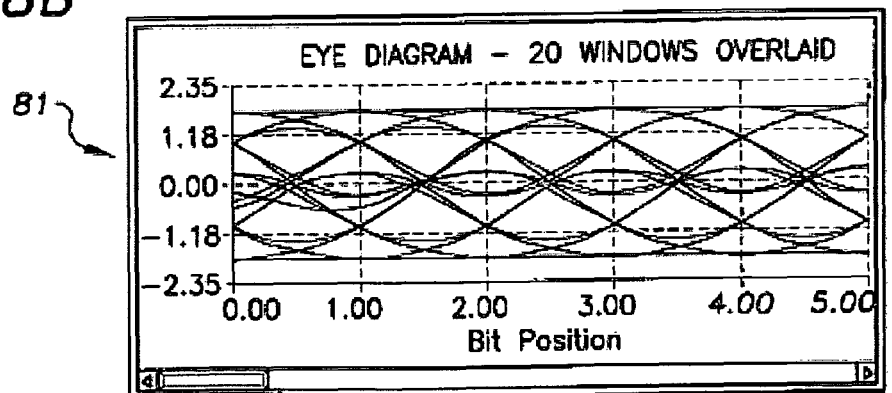
Figure 8C:
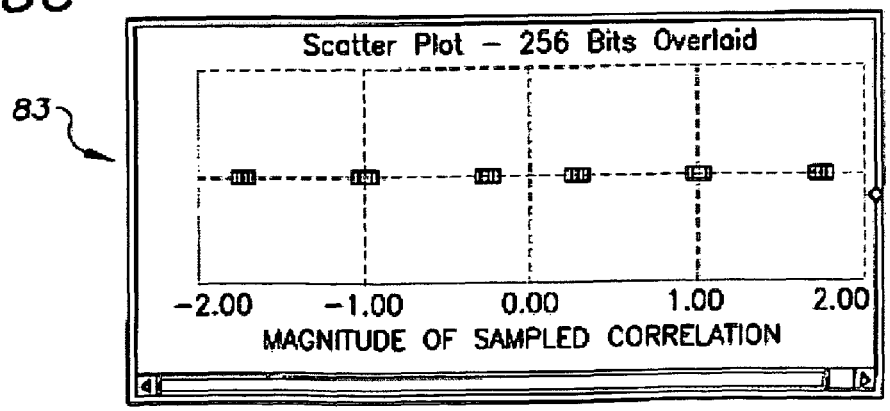

FIGS. 8A, 8B, and 8C illustrate the negative impact of ISI on the receiver waveforms that were previously shown in FIGS. 4, 5 and 6. Again, FIGS. 8A, 8B, and 8C are computer video displays produced by the DSP software. In order to more clearly illustrate the waveforms, the noise or distortion introduced earlier by channel 40 has been turned off. FIG. 8A illustrates a plot 79 of waveforms in similar to the waveforms in FIG. 4. FIG. 8B illustrates a plot 81 of the corresponding eye diagram, similar to the eye diagram in FIG. 5, for the waveforms shown in FIG. 8A. FIG. 8C illustrates a plot 83 of the corresponding scatter diagram for the eye diagram shown in FIG. 8B. Note that the sampled values 85 in FIG. 8A vary in magnitude, depending on the polarity of the preceding and succeeding pulses. Bit decisions can no longer be made independently in an optimum fashion. The eye diagram in FIG. 8B is somewhat closed, resulting in more susceptibility to any noise that ordinarily would be in the channel, for example, channel 40. The scatter plot 83 in FIG. 8C shows the increased dispersion due to the ISI. Although the bandwidth of a signal utilizing a more slowly changing pulse is narrower, the extended pulse skirts cause intersymbol interference, resulting in an increased number of bits being declared in error, as shown in FIG. 8C.

In some prior art transmission systems, receivers may include sophisticated algorithms for addressing inaccuracies due to ISI. Instead of looking at individual received pulses, these algorithms typically examine each given pulse as well as certain of its neighbors. These algorithms are called equalizers in the art and they can effectively subtract off or remove some of the interference caused to a symbol by its neighbors. These algorithms are typically implemented in DSP software which operates on the sampled receiver outputs. In essence, an equalizer must examine groups of received pulses simultaneously, considering all possible combinations of zeros or ones in each position. Quite often, the number of neighboring pulses that affect a given pulse is small. For example, in some prior art equalizers, only the immediate predecessor and immediate successor of a given pulse overlap and thus affect the given pulse. In this case, the so called ISI span of the pulse is three bits. The ISI span typically comprises the current symbol and the other symbols affecting it.

Figure 9:
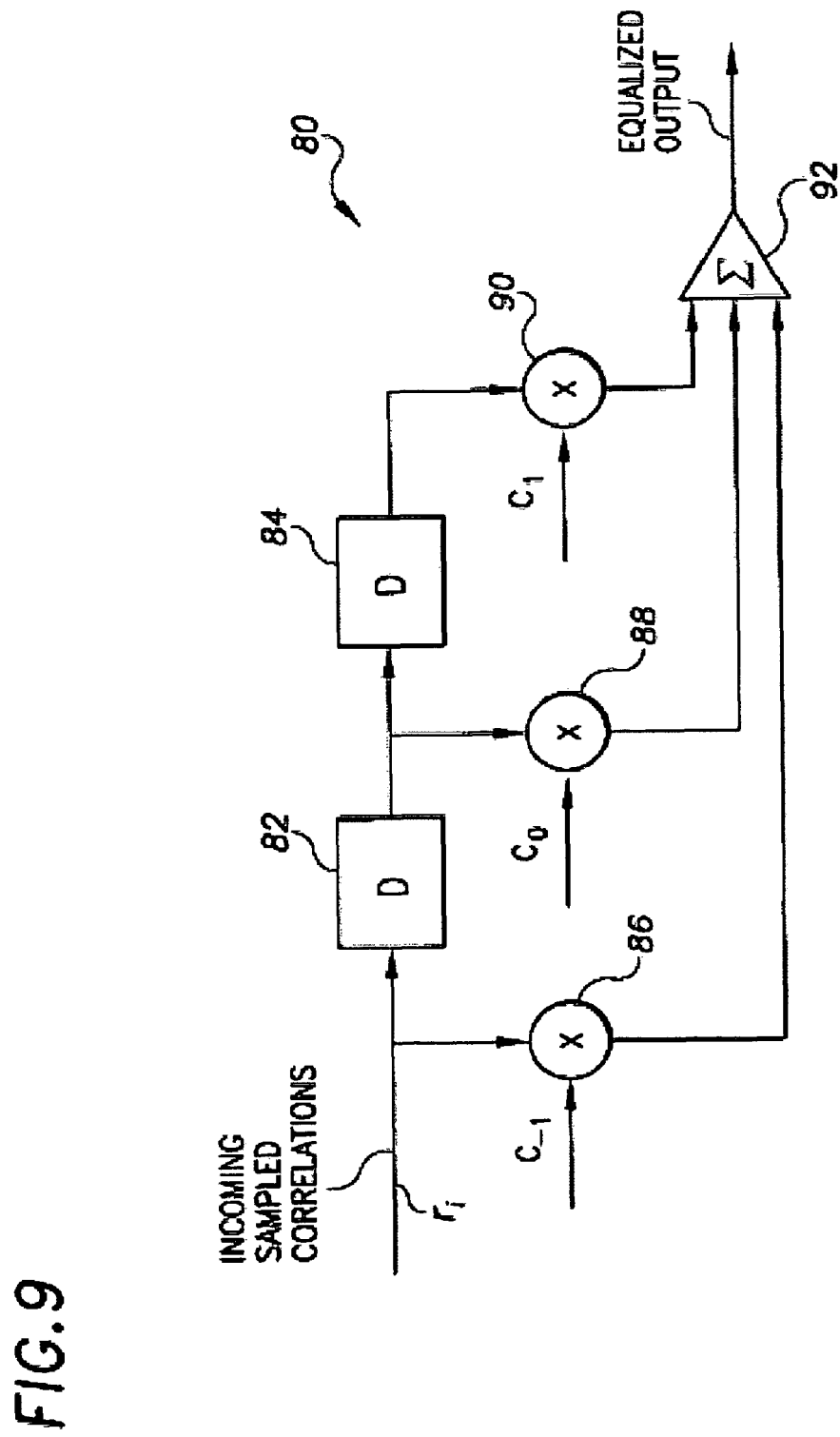
FIG. 9 is a block diagram of a transversal equalizer according to the prior art.

One simple type of equalizer used in the prior art is referred to as a transversal equalizer. A typical transversal equalizer 80 is schematically illustrated in FIG. 9. Transversal equalizer 80 is a relatively simple device in which received neighboring pulse correlation values are weighted and subtracted from the corresponding current bit pulse the receiver is attempting to process or decide upon. Equalizer 80 typically consists of several delays or storage, elements 82 and 84, which can hold the contents of a sequence of receiver output values $r_i$ such as the receiver output values from the integrator/correlator 52 shown in FIG. 4. The set of delay elements 82 and 84 is often called a storage register. Equalizer 80 also typically includes a series of multiplication blocks 86, 88, and 90 which multiply the corresponding bits with weighting coefficients, typically designated $c_i$ which are typically constant numbers. After multiplying the signals, including some delayed signals, by coefficients $c_i$ in multiplication blocks 86, 88, and 90, the resulting signals are summed in summing block 92 to provide an equalized output which approaches the value of the transmitted signal $\{a_i\}$.

As correlation values are produced by the receiver, they are placed into the left end of the storage register after the contents are slid to the right. Past correlation values eventually fall off the end. In this manner, received correlation values are placed into their proper relative time position for the weighting and subtraction operation. In this way the ISI from neighboring bits can be partially removed by means of transversal equalizer 80. The word partially is important here, since the receiver, for example, receiver 22 or 44, having a transversal equalizer 80 does not know the exact value of the neighboring bits, and thus must estimate their weighting coefficients. Therefore, the accuracy of prior art equalizers, such as equalizer 80, is limited by the algorithm used to guess the value of the weighting coefficients, that is, at least some error is inherent in prior art equalizers.

Figure 10A:
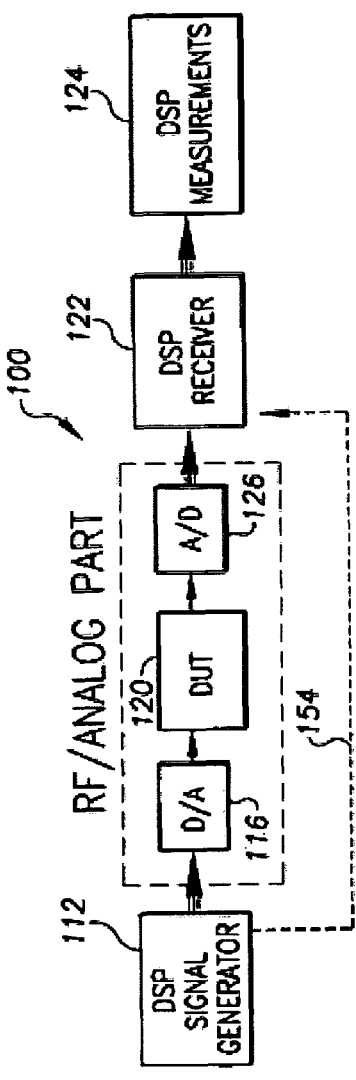
FIG. 10A is a block diagram of a data communication system.
Figure 10B:
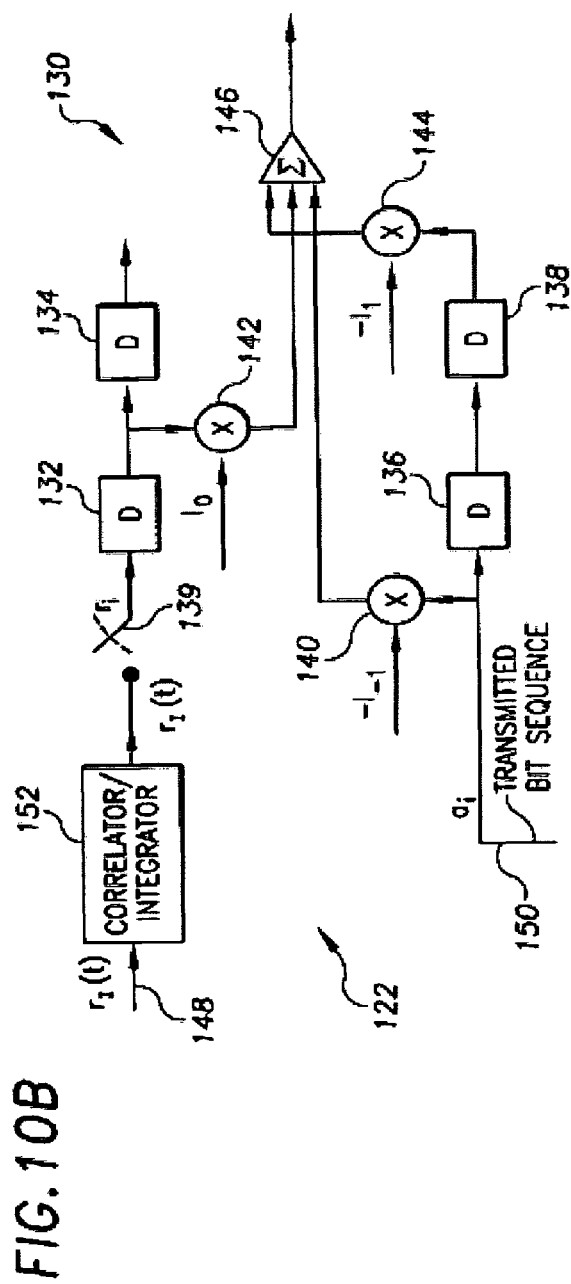
FIG. 10B is a block diagram of the equalizer used in FIG. 10A.

FIGS. 10A and 10B illustrate schematic diagrams of a data communication system 100 and an equalizer 122. FIG. 10A illustrates a schematic block diagram of a data communication system 100. Though system 100 can be employed in any type of data communication system, the system 100 can be used in testing or measurement of communication system or component performance. More or less complete control over the signals that are being passed through system 100 is provided. System 100 is used to measure the performance of an electronic component or system, or, in short, a device under test (DUT). For example, system 100 may be used to determine a DUT's capability to correctly transmit and/or receive communications signals. This function of system 100 contrasts with the typical ultimate end-use scenario of the communication system, for example, communication system 10 illustrated in FIG. 1. In the test/measurement scenario of system 100, system 100, for example, can verify that a communication receiver 122 is able to correctly make decisions about transmitted bits it receives.

In order to verify the receiver's decisions about the bits it receives, according to one aspect of the invention, receiver 122 knows whether each bit it receives should be a zero or a one. In the test/measurement scenario, since the generated test signals produced by signal generator 112 are known, this information is provided to receiver 122. According to one aspect of the invention, the simulation environment is provided by software tools for example, by the DSP software, which is test and measurement environment software. In one aspect of the invention, test signals are generated to measure the performance of a software model of a communication system. Since more and more of the functionality of physical systems is being implemented within software, the difference between software implementation of a process and physical devices performing a process has become blurred to the extent that software and hardware test environments are often indistinguishable. Indeed, more and more hardware test equipment products are based on embedded DSP software.

The block diagram of a typical hardware/software test equipment architecture 100 is shown in FIG. 10A. Within system 100, DSP software is employed at both ends of the signal path. For example, software is used to generate the test signal, including the sequence of bits to be transmitted. System 100 in FIG. 10A includes a digital signal source 112, for example, a digital signal generator. When implemented in DSP software, digital signal generator 112 typically comprises a DSP signal generator which introduces at least some ISI to the transmitted signal. In one aspect of the invention, software is used to perform the function of transforming a bit sequence into the pulse like waveform, for example, the pulse like waveform shown in FIG. 2 as the output of transmitter 38. After providing the signal via signal generator 112, the sampled-data signal is transformed into the analog domain through an analog-to-digital conversion process, for example, by means of D/A converter 116. This process entails converting a sequence of numbers (samples) into an analog waveform that exists in physical time. The analog signal produced by D/A converter 116 is transmitted to the Device Under Test (DUT) 120. Though many types of devices may also be used for DUT 120, in one aspect of the invention, DUT 120 represents the analog circuitry in a physical transmitter/amplifier. This analog circuitry is necessary for converting the signal to an RF frequency and also for amplifying the signal, among other functions.

After passing through DUT 120, the signal (typically containing at least some ISI and at least some noise introduced by DUT 120) is forwarded to analog-to-digital converter 126 and then to receiver 122. According to one aspect of the invention, after processing in receiver 122 the received signal may be forwarded to measurement device 124, for example, a DSP measurement device to determine or measure the distortion produced by DUT 120.

For example, manufacturers are often responsible for ensuring that their transmitting equipment emits a signal that complies with certain standards. These standards prescribe certain requirements on occupancy of the frequency spectrum and also achievable received accuracy. Distortions imparted to the signal due to imperfections in the analog transmitter circuitry must be carefully controlled. It is very important that manufacturers be able to measure these distortions accurately. It is most useful for this purpose to remove the effects of ISI at the receiver so that the distortion caused by the analog circuitry may be clearly viewed in isolation.

The transmitted bit sequence generated by signal generator 112 is known. As a result, a modification of the transversal equalizer of FIG. 9 can be effectively employed for testing the performance of DUT 120. In one aspect of the invention for use in testing a system or a system component, receiver 122 includes an equalizer having at least some information concerning the signal transmitted by signal generator 112. One example of a receiver 122 is shown in block diagram form in FIG. 10B.

FIG. 10B illustrates a schematic block diagram of receiver 122. Receiver 122 may include a correlator/integrator 152 similar to correlator/integrator 52 shown in FIG. 4. Receiver 122 includes or comprises at least one equalizer 130 as shown in FIG. 10B. The equalizer 130 may include at least one first set of delay elements, comprising at least one or may be at least two delay elements 132 and 134, similar to delay elements 82 and 84 as shown in FIG. 9. However, equalizer 130 also comprises at least one second set of delay elements, comprising at least one and preferably at least two delay elements 136 and 138. More delay elements 136 and 138 may also be used depending upon the number of taps desired. Also, similar to the equalizer shown in FIG. 9, equalizer 130 also includes a sampling switch 139; multiplication blocks 140, 142, and 144; and at least one summing block 146. Similar to the prior art equalizer 80 shown in FIG. 9, delay elements 132, 134, 136 and 138 and multiplying blocks 140, 142 and 144 are used to modify the bit sequence being processed by equalizer 130 by subtracting components of prior and subsequent bit sequences in order to reduce ISI in the received signal. However, contrary to prior art methods and devices, instead of estimating or guessing the 151 coefficients $c_i$ as in FIG. 9, in one aspect of the invention, equalizer 130 employs at least three ISI coefficients 1 having at least some information concerning the actual 181 of the transmitted signal, for example, the signal transmitted by signal generator 112. More coefficients $l_i$ may be used as required by the number of taps used. The at least some information concerning the as transmitted signal is used in equalizer 130 to reduce at least some, preferably essentially all, the ISI in received signal r(t).

Contrary to the prior art equalizer 80 shown in FIG. 9, equalizer 130 includes at least two inputs: a first input 148 for the received signal r(t) and a second input 150 for inputting at least some information related to the transmitted bit sequence $\{a_i\}$, for example, the bit sequence generated by signal generator 112. That is, according to one aspect of the invention, equalizer 130 includes at least one input 150 for receiving an electrical signal providing at least some information concerning the nature or content of the bit sequence initially transmitted over the channel, for example, through DUT 120. This signal is provided to input 150 over a cheater line 154 that electrically couples signal generator 112 with receiver 122. For example, according to one aspect of the invention, the information transmitted over cheater line 154 concerns the ISI produced in the as transmitted signal leaving signal generator 112. In another aspect of the invention, cheater line 154 transmits the actual transmitted signal. In another aspect of the invention, cheater line 154 transmits information concerning ISI coefficients $l_i$.

The inventor refers to one aspect of the invention as an ideal equalizer. This term is used because in one aspect of the invention, system 100 allows the ideal (or complete) removal of ISI. In contrast to the situation for the transversal equalizer of FIG. 9, where the neighboring bits must be estimated before they can be weighted and subtracted, known values for these bits can be employed in an equalizer instead of estimated values or guesses. This results in essentially complete elimination of ISI effects within the signal. Once these effects are removed, additional distortion due to other causes can be more clearly determined.

In the prior art transversal equalizer of FIG. 9, the weighting coefficients $c_i$ are chosen to minimize the effect of the ISI on the output bit decisions. This optimization can only be made in the statistical sense, since the bits in the transmitted sequence are unknown random variables. According to one aspect of the present invention shown in FIGS. 10A and 10B, the values of the transmitted bits are known. In equalizer 130, the "current" bit to be estimated is derived by sampling the receiver's output waveform at the correct instant, as is done by the integrator 52 of FIG. 4, which is similar to the prior art transversal equalizer of FIG. 9. However, according to one aspect of the present invention, the weighting coefficients $c_i$ corresponding to the neighboring bits to be subtracted off are not derived, but are transmitted to the receiver by passing the original transmitted bit stream through line 154 and another tapped delay line 150, where each is multiplied by its respective ISI coefficient. In this aspect of the invention, the weighting coefficients q are changing with each new bit that enters the shift register, these entering bits representing the original, known, transmitted sequence Given this knowledge of the transmitted bit sequence, the optimum, deterministic weighting coefficient may be constructed which exactly subtracts off a given neighboring bit's contribution to the ISI.

Figure 11:
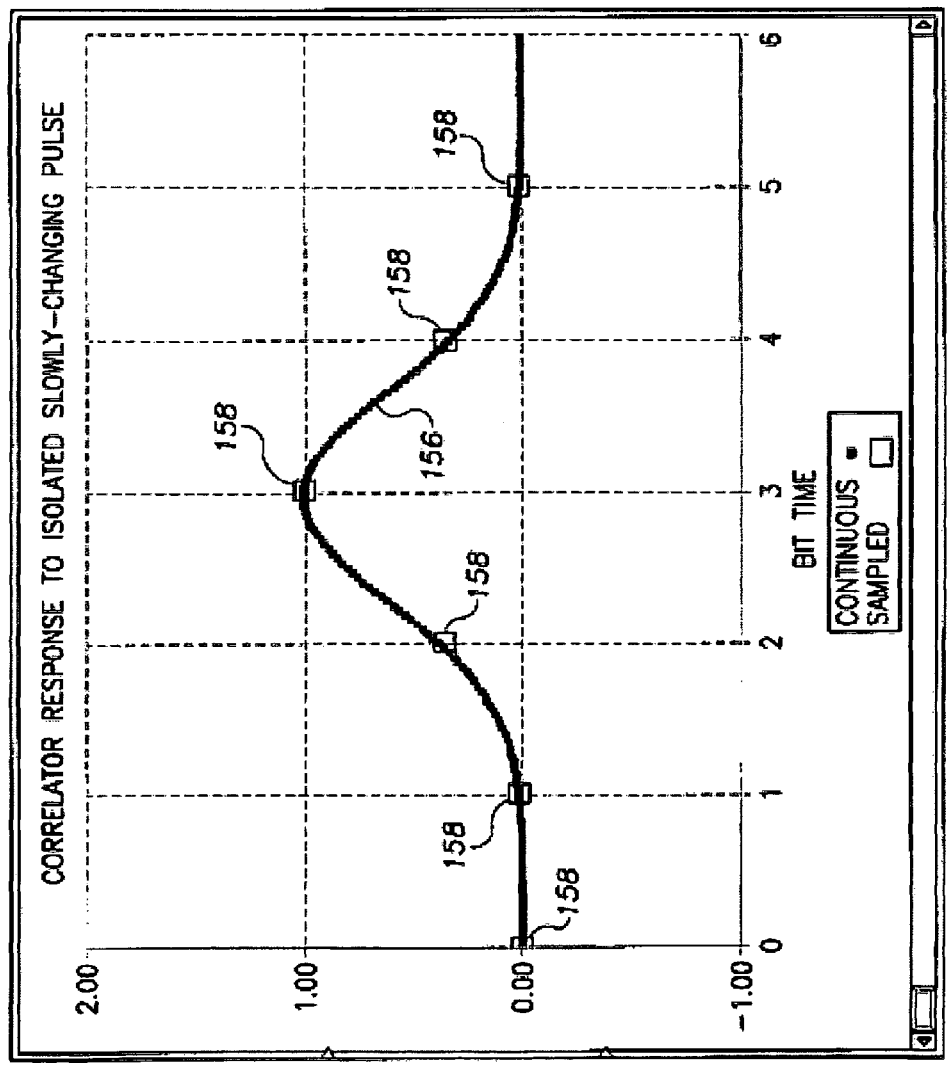
FIG. 11 is a computer video display of a correlator response created by the DSP software.

An illustration of the benefits of using the invention is shown in FIGS. 11, 12, 13A, 13B and 13C. FIG. 11 illustrates a typical output from a correlator/integrator, for example, correlator/integrator 52 shown in FIG. 4, in response to a single isolated pulse, for example, pulse 76 shown in FIG. 7A. FIG. 11 is a computer video display produced by the DSP software. The x-axis of FIG. 11 represents bit periods and the y-axis represents voltage. As in FIG. 3, the single pulse is shown as a solid curve 156 in FIG. 11 and the sampled output from the correlator/integrator is shown as open squares 158. Generally, if a modulation pulse extends over n preceding bits and m succeeding bits, the ISI span is equal to 2n+2m+1 bits. In the example shown in FIG. 11, the ISI span is equal to five bits. However, as can be seen from FIG. 11, there is significant ISI over only about three bit periods. That is, essentially full equalization can be achieved by considering the response over just three bit periods. Thus, the aspect of the present invention shown in FIG. 10B, having only three total taps, is applicable to the pulse shown in FIG. 11. Generally, the off-center ISI coefficients $l_{-1}$ and $l_1$ of FIG. 10B, that is, the coefficients associated with bit times 2 and 4 in FIG. 11, are determined from a priori knowledge of the signal format, and range in value from 0 to 1.0, for example, the values of $l_{-1}$ and $l_1$ in FIG. 11 are each about 0.42. Further ISI coefficients, that is $l_{-n}$ and $l_n$ may also be used depending on the number of taps used. These coefficients can be programmed into a DSP software model of the aspect of the invention shown in FIGS. 10A and 10B.

Figure 12:
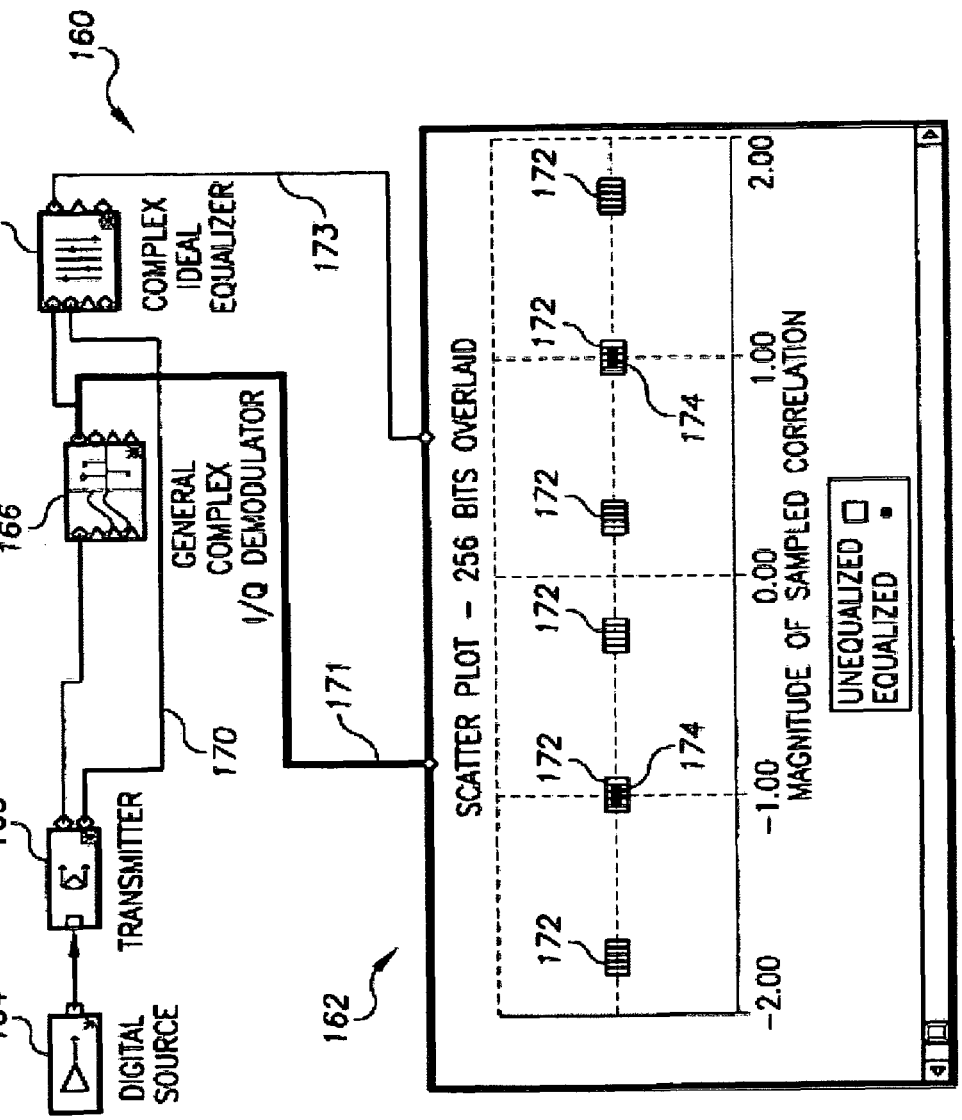
FIG. 12 a circuit diagram with an associated computer video display of a communication system testing arrangement associated scatter plot.

A block diagram 160 as implemented in DSP software and a typical scatter plot 162 produced are shown in FIG. 12. FIG. 12 is a computer video display produced by the DSP software. Similar to the earlier systems, the block diagram 160 includes a digital source, for example, a computer or a digitalized voice, a transmitter 165, a device under test, 166, and an equalizer 168 according to one aspect of the present invention. The device under test 166 is a general complex I/O demodulator which introduces at least some distortion or noise to the signal transmitted by transmitter 165. The block diagram 160 includes at least one electrical connection 170 that bypasses device under test 166 and electrically couples an output of transmitter 165 and an input of equalizer 168. The results that can be obtained are illustrated in scatter plot 162 in FIG. 12.

Scatter plot 162 in FIG. 12 illustrates a scatter plot similar to scatter plot 70 shown in FIG. 6. The source of the data displayed in plot 162 is identified by line 171 for the unequalized signal output by device under test 166 and line 173 for the equalized signal output by equalizer 168. Plot 162 illustrates the scatter of both the unequalized case, shown with open squares 172, and the equalized case is shown with solid squares 174. The dispersion in the scatter plot of the unequalized signal points 172 is almost completely eliminated when is used to produce the unscattered signal points 174.

Figure 13A:
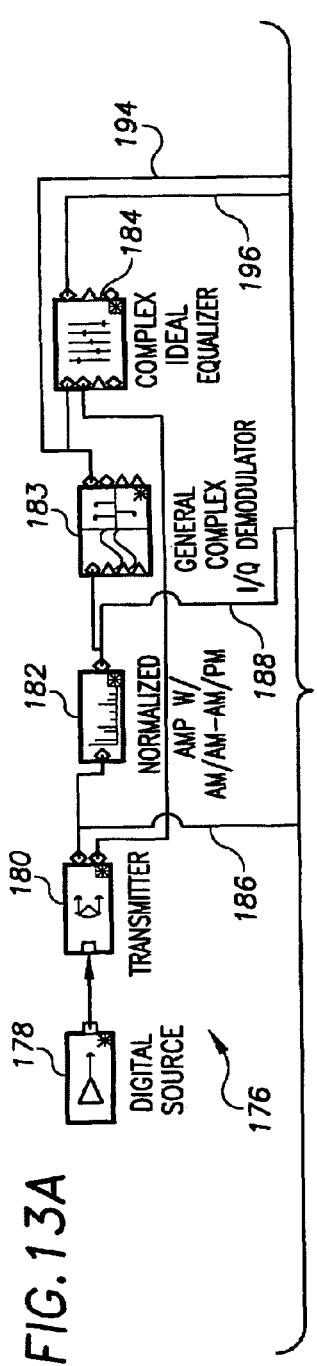
FIGS. 13A, 13B, and 13C are computer video displays of a communication system testing arrangement, their representative transmitted waveforms, and a scatter plot.
Figure 13B:
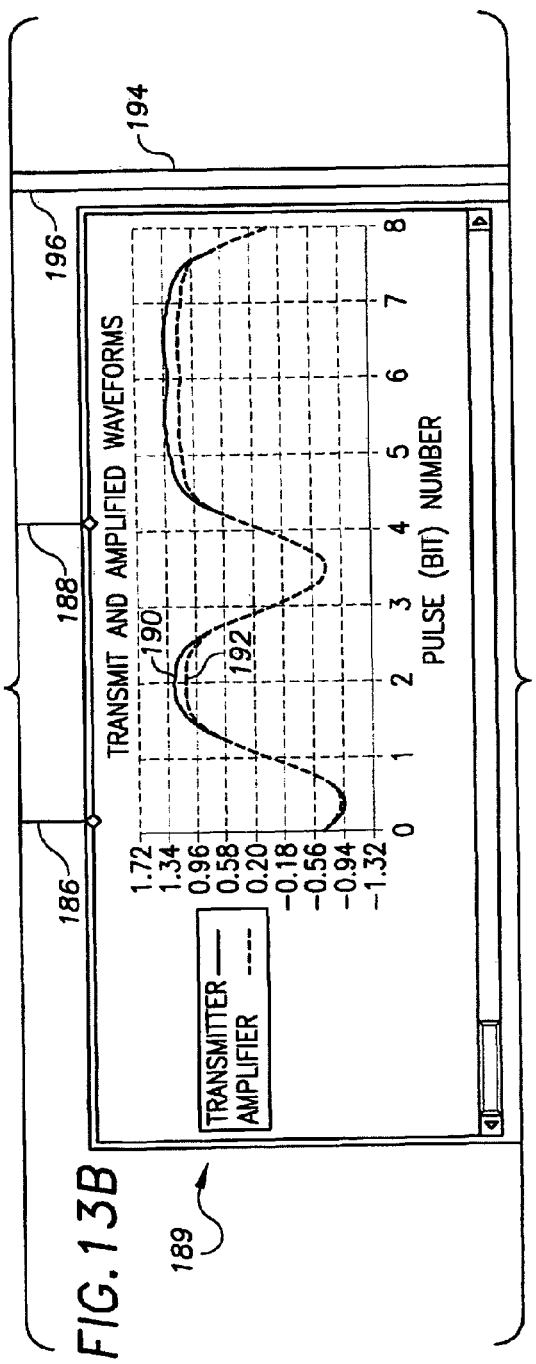
Figure 13C:
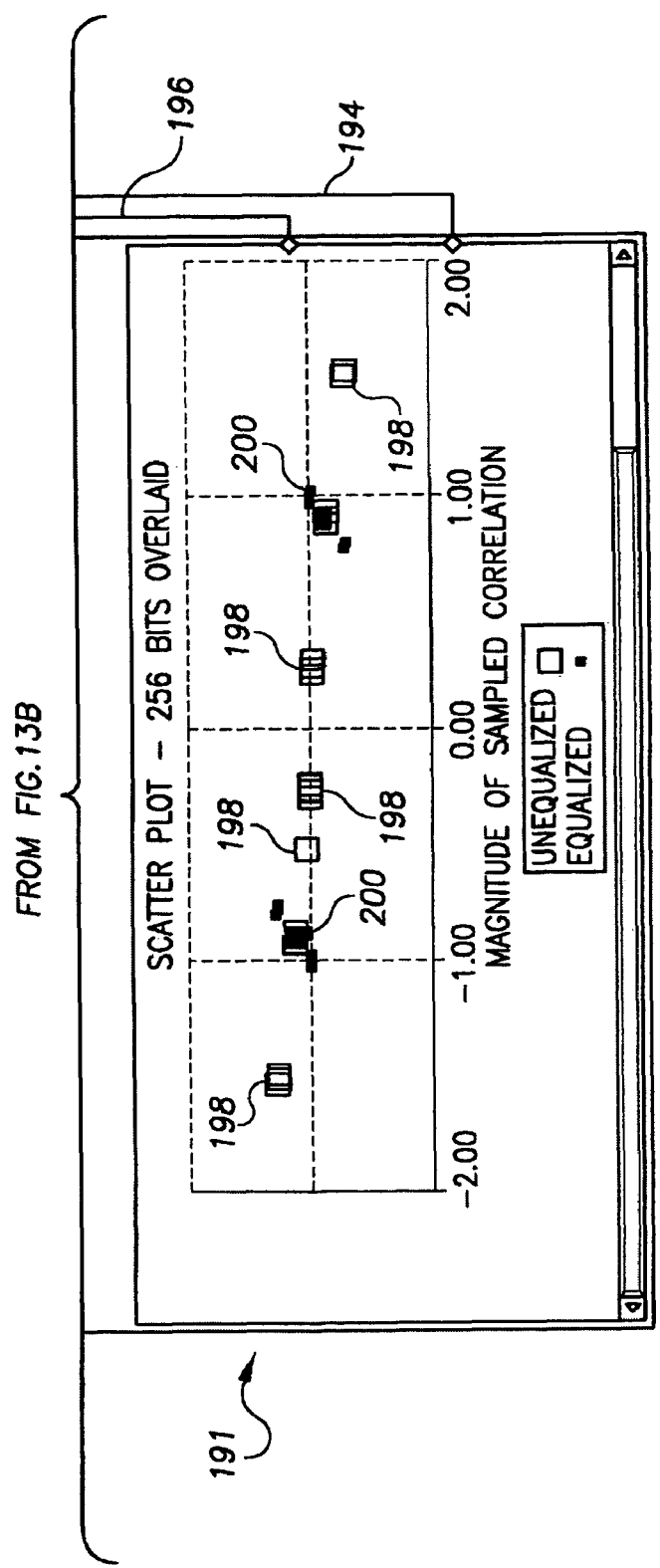

FIGS. 13A, 13B and 13C are computer video displays produced by the DSP software. FIG. 13A is a block diagram 176 for testing the performance of a device under test. Block diagram 176 includes a digital source 178, a transmitter 180, a device under test 182, a general complex I/O demodulator 183 similar to demodulator 166 in FIG. 12, and an equalizer 184. The device under test 182 comprises a model of a power amplifier, specifically, a normalized power amplifier with AM/AM-AM/PM modulation.

FIG. 13B illustrates a plot 189 of the waveforms transmitted by transmitter 180 and by amplifier 182, as identified by connections 186 and 188 and waveforms 190 and 192, respectively. As shown by waveform 192 in FIG. 13B, amplifier 182 saturates at a certain level, clipping off the signal peaks. This saturation can cause distortion in the output estimate of the transmitted bits. The corresponding scatter plot 191 is shown in FIG. 13C. As shown by connections 194 and 196, scatter plot 191 is generated from the signal output by demodulator 183 and equalizer 184, respectively, and displays scattered unequalized points by open squares 198 and equalized points by solid squares 200. Scatter plot 191 reveals the distortion due to amplifier 182 after the signal is passed through equalizer 184 according to one aspect of the present invention. The scatter plot 191 of FIG. 13C shows that amplifier 182 is also causing some tilt in the scatter plot 191, due to phase distortion. In the unequalized output (the open squares 198) in FIG. 13C, the dispersion due to ISI masks the dispersion due to distortion from amplifier 182. The distortion due to amplifier 182 could not be effectively measured without the use of the equalizer 184.

There are at least two benefits to the use of this invention. First, the invention obviates the need for a manufacturer to design and build complex equalization algorithms and/or circuits in the early stages of a communication system design. This specifically benefits manufacturers of test equipment, who can employ the invention to provide the equalization function without the need for more sophisticated algorithms. The second benefit is related to accuracy of equalization. Prior art equalizers (which do not have knowledge of the transmitted bit stream) can only provide imperfect removal of ISI. Determining the accuracy with which prior art equalizers can estimate and subsequently remove ISI is problematic. The performance of equalization algorithms is affected by distortions in transmitter analog circuitry, in the same way as other receiver functions. The use of the present invention allows for removal of at least some ISI, and in some aspects essentially all of the ISI, under any operating conditions, thus allowing the tests to reveal only the effect of other degradations in the receiver correlator outputs.

While various embodiments of the invention have been described, it will be apparent to those of ordinary skill in the art that many more embodiments and implementations are possible that are within the scope of this invention.

I claim:

1. A device for characterizing the distortion produced by an electronic component, comprising:
    generating a first electrical signal having intersymbol interference; a first channel for transmitting the first electrical signal, the first channel containing the electronic component having a source of signal distortion where a second electrical signal has at least some distortion present;
    a second channel for transmitting a third electrical signal containing at least some information characterizing the first electrical signal; and
    processing the third electrical signal and the second electrical signal to provide at least some information concerning the distortion produced by the electronic component.

2. The device of claim 1, where the processing the third electrical signal and the second electrical signal comprises a fourth electrical signal having less intersymbol interference than the second electrical signal.

3. The device of claim 1, where the third electrical signal and the second electrical signal comprises an equalizer having at least some information characterizing the intersymbol interference of the first electrical signal.

4. The device of claim 1, where:
    a first input for the second electrical signal;
    a second input for the third electrical signal; and
    removing at least some intersymbol interference from the second electrical signal by an equalizer connected to the first input and the second input.

5. The device of claim 4, where removing at least some intersymbol interference is accomplished by sampling the second signal to produce at least one bit sequence.

6. The device of claim 4, where the at least some information characterizing the intersymbol interference comprises at least one intersymbol interference coefficient.

7. The device of claim 1, where the electronic component is a high speed data transmission device.

8. An electronic signal equalizer for minimizing the content of intersymbol interference in an electrical signal, comprising:
    a first input for receiving a first electrical signal having at least some intersymbol interference and at least some distortion other than intersymbol interference;
    a second input for receiving a second electrical signal containing at least some information characterizing the first electrical signal;
    the second electrical signal further comprises a second series of bit sequences and the means for producing the third electrical signal that comprises subtracting at least one bit sequence from the second series of bit sequences from the first series of bit sequences; and
    the equalizer connected to the first input and the second input for producing a third electrical signal having less intersymbol interference than the first signal.

9. The equalizer of claim 8, further comprising multiplying the at least one bit sequence from the second series of bit sequences by a constant prior to subtracting the at least one bit sequence from the second series of bit sequences.

10. The equalizer of claim 9, where the constant comprises at least one intersymbol interference coefficient.

11. A signal processing system for producing electrical signals having reduced intersymbol interference, comprising:
    a first electrical signal having intersymbol interference;
    a first channel for transmitting the first electrical signal, the first channel having a source of signal distortion where a second electrical signal has at least some distortion produced;
    a second channel for transmitting a third electrical signal containing at least some information characterizing the first electrical signal; and
    an equalizer capable of processing the third electrical and the second electrical signal to produce a fourth electrical signal having less intersymbol interference than the second electrical signal.

12. The signal processing system of claim 11, where the equalizer comprises:
    a first input for the second electrical signal;
    a second input for the third electrical signal; and means connected to the first input and the second input for removing at least some intersymbol interference from the second electrical signal.

13. The signal processing system of claim 12, where the at least some information characterizing the intersymbol interference comprises at least one intersymbol interference coefficient.

14. The signal processing system of claim 11, where the source of distortion in the first channel is an electronic device.

15. The signal processing system of claim 14, where the electronic device is a high speed data transmission device.

\* \* \* \* \*

UNITED STATES PATENT AND TRADEMARK OFFICE
CERTIFICATE OF CORRECTION

Page 1 of 1

PATENT NO. : 7,940,838 B1
APPLICATION NO. : 12/460566
DATED : May 10, 2011
INVENTOR(S) : Kurt R. Matis It is certified that error appears in the above-identified patent and that said Letters Patent is hereby corrected as shown below:

In the Claims:

Claim 4, column 14, line 13, please delete "The device of claim 1," and substitute "The device of claim 3,".

Signed and Sealed this
Third Day of January, 2012

David J. Kappos
*Director of the United States Patent and Trademark Office*